No. 718,554. PATENTED JAN. 13, 1903.
W. G. WARING.
METHOD OF EXTRACTING ZINC.
APPLICATION FILED JUNE 14, 1902.
NO MODEL.
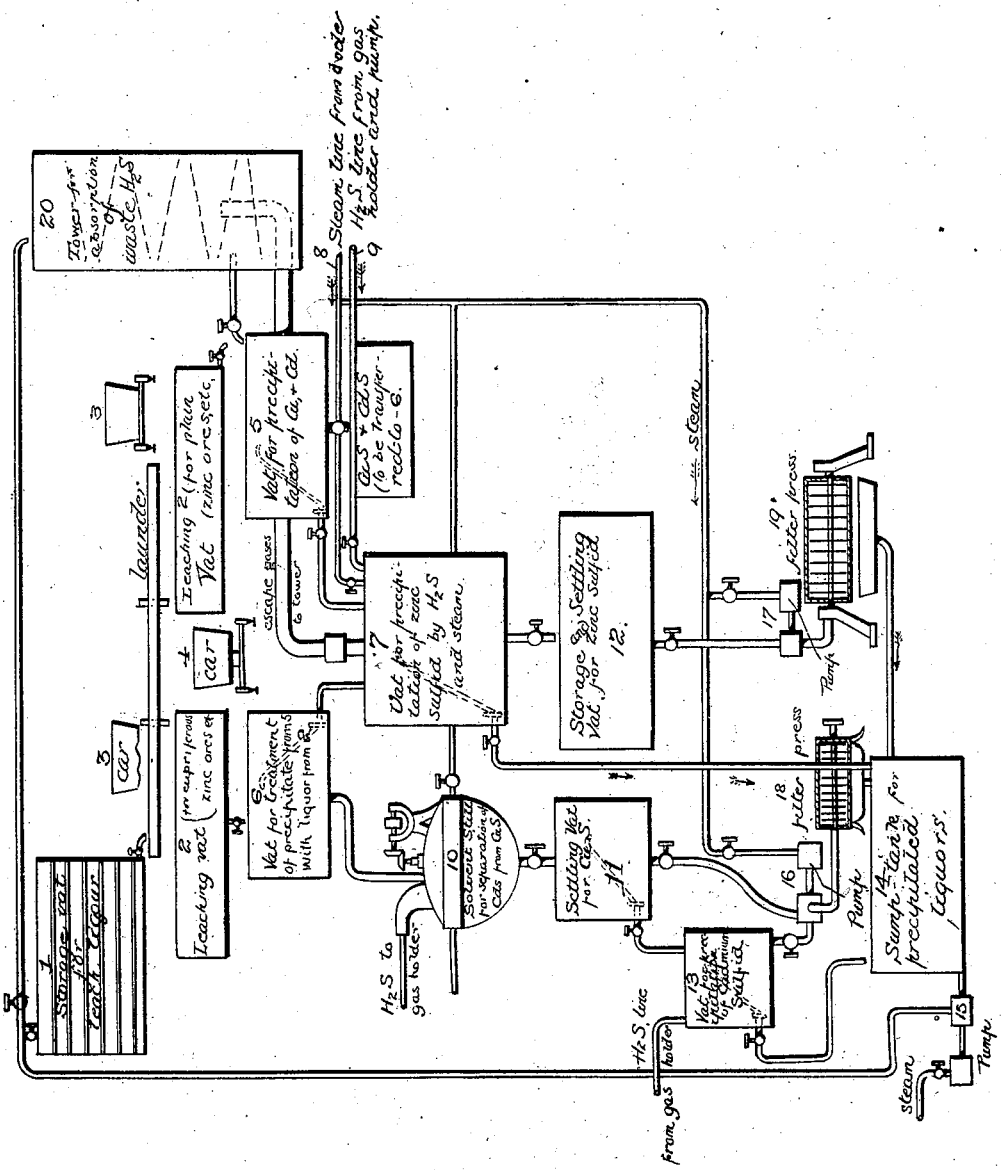
Attest:
C. S. Middleton
Edward Sutton
Inventor:
William G. Waring.
by Ellis Spear
Atty.

UNITED STATES PATENT OFFICE.

WILLIAM GEORGE WARING, OF TYRONE, PENNSYLVANIA.

METHOD OF EXTRACTING ZINC.

SPECIFICATION forming part of Letters Patent No. 718,554, dated January 13, 1903.

Application filed June 14, 1902. Serial No. 111,750. (No specimens.)

*To all whom it may concern:*

Be it known that I, WILLIAM GEORGE WARING, a citizen of the United States, residing at Tyrone, Blair county, Pennsylvania, have invented certain new and useful Improvements in Methods of Extracting Zinc, of which the following is a specification.

My invention relates to a method of extracting zinc in the form of pure zinc sulfid from crude zinkiferous ores, metallurgical products or residues, and from natural or artificial solutions or precipitates therefrom containing zinc in any state of combination and of separating the pure zinc sulfid from all other metallic or earthy combinations.

My method is based upon the following chemical reactions:

(A.) The natural and artificial sulfids of zinc, cadmium, and some other metals are rapidly and completely decomposed at ordinary temperatures by acidulated solutions of ferric sulfate, $Fe_2(SO_4)_3$, with the liberation of sulfur and the formation of zinc sulfate, &c., as follows:

$$ZnS + Fe_2(SO_4)_3 = ZnSO_4 + 2FeSO_4 + S, \quad (1)$$

the ferric sulfate being reduced to ferrous sulfate.

(B.) All oxidized compounds of zinc are soluble in water acidulated with sulfuric acid—e. g.:

$$ZnO + H_2SO_4 = ZnSO_4 + H_2O,$$

$$ZnCO_3 + H_2SO_4 = ZnSO_4 + CO_2 + H_2O,$$

$$Zn_2SiO_4 + 2H_2SO_4 = 2ZnSO_4 + SiO_2 2H_2O, \text{ &c.}$$

(C.) If to a solution of the sulfates of zinc, iron, copper, cadmium, silver, and the other metals (excepting lead, which is quite insoluble in such a solution) there be added an amount of artificially-precipitated zinc sulfid equivalent to the amount of cadmium, copper, and silver present in the solution, the whole of these last-named metals will precipitate as sulfids, the zinc in the added zinc sulfid dissolving as sulfate, thus:

$$CuSO_4 + ZnS = ZnSO_4 + CuS. \quad (2)$$

The same result is of course obtained when an exact equivalent of hydric sulfid ($H_2S$) is added to the solution—i. e., the copper, silver, and cadmium alone are precipitated.

(D.) If hydrogen sulfid ($H_2S$) be conducted into a dilute solution of zinc sulfate, such as results from the last-named operation under certain conditions hereinafter to be specified, the whole of the zinc may be precipitated as pure white zinc sulfid, with the liberation of an equivalent of sulfuric acid, thus:

$$ZnSO_4 + H_2S = ZnS + H_2SO_4. \quad (3)$$

Under the conditions to be prescribed no other metals or compounds of any kind are precipitated along with the zinc sulfid, so that the latter when separated from the fluid by decantation or filtration is at once available as a pure white pigment or after calcination as oxid for use as a pigment or for the preparation of chemically-pure metallic zinc.

(E.) If the acid solution resulting from the last-named reaction and containing ferrous sulfate be aerated by exposure to the atmosphere at a suitable temperature, the ferric sulfate is regenerated at the expense of a molecule of sulfuric acid for every two molecules of ferrous sulfate, thus:

$$2FeSO_4 + H_2SO_4 + O = Fe_2(SO_4)_3 + H_2O. \quad (4)$$

Although it is stated in nearly all, if not all, chemical treatises and text-books that zinc is not precipitated from acid solutions by $H_2S$, Berzelius long ago noted that it is partially precipitated by $H_2S$ from saturated neutral solutions. Eliot and Storer noted later that ZnS may be precipitated by $H_2S$ from the sulfate or chlorid in the presence of very dilute sulfuric or hydrochloric acid, and in 1888-89 Baubigny reported that a neutral solution of the sulfate or chlorid containing 0.3 per cent. of either salt may be completely precipitated after saturation with the gas and after standing several hours. This chemist also noted that if the solution be heated thirty to ninety times the amount of acid combined with the zinc must be present in a free state to prevent any precipitation. He regarded the decomposition of $ZnSO_4$ by $H_2S$ as a function not only of the weight of the free acid to the weight of the metal, but also of the acid to the metal. (*Compt. Rend.*, CVII, 1148.)

$H_2S$ has long been in use in analytical work to separate zinc as sulfid from acetic solutions, zinc sulfid being quite insoluble in acetic acid; but in all cases heretofore recorded, so far as I have been able to learn, the solutions have been subjected to the action of a large excess of the gas, a procedure which is unsuited to economical operations upon a large scale.

To carry out successfully upon the large scale a method of separating zinc from impure sulfate solutions by means of hydrogen sulfid it is essential, first, that the solvent solution shall be capable of easy regeneration without consumption of acids or other expensive chemicals; second, that the precipitant ($H_2S$) shall be capable of separating nearly or wholly its equivalent of metal.

In my researches, undertaken to elucidate the problem, I discovered that very dilute acid solutions of ferric sulfate containing not more than 0.6 to 1.2 per cent. of free acid and much less ferric salt are much more energetic in their action at ordinary temperatures upon zinkiferous sulfids than are strong solutions. Thus a natural mine-water containing 0.34 per cent. metallic zinc and 0.29 per cent. iron as sulfates, together with a little copper and cadmium, after complete precipitation of the zinc, copper, and cadmium as sulfids by $H_2S$ dissolved immediately afterward 0.33 per cent. of zinc from ordinary zinc-blende concentrates upon passing over the surface of the concentrates for a distance of one hundred and sixty feet in ten minutes' time without further exposure to the atmosphere than was gained during the lixiviation, which was conducted in a slightly-inclined trough. After a second precipitation with $H_2S$ precisely the same amount of zinc was again dissolved in the same time and under the same conditions and no diminution was found even upon a third repetition of the process.

In regard to the second requirement I find that at the ordinary temperatures (60° to 80° Fahrenheit) under the most favorable conditions only about four-fifths of the amount of zinc equivalent to the amount of $H_2S$ conducted into the solution is precitated as sulfid from neutral or slightly acid solutions containing 0.8 per cent. or less of metallic zinc in the form of sulfate. Somewhat less is separated from chlorid solutions. If the temperature of the solution is raised to about 100° Fahrenheit before the addition of the gas, the passage into the solution of a large excess of gas does not increase the amount of zinc precipitated. If the temperature be below 70° Fahrenheit, 99.5 per cent. of the zinc is separated as sulfid from a solution containing 0.8 per cent. of the metal by using an excess of the gas. The same result is reached in the case of solutions containing 0.3 to 0.5 per cent. of metallic zinc, when only the exact equivalent of the zinc present is added in the form of $H_2S$, and the temperature of the solution is afterward altered by heating to 160° to 180° Fahrenheit—that is, ninety-five to ninety-nine per cent. of the zinc separates as sulfid; but the sulfid separated under such conditions is apparently a different substance from that separated at the ordinary temperature. It is a pure white amorphous heavy powder, subsiding quickly and easily separated by filtration. Chemically it is ZnS, while the more slimy and slowly-subsiding compound precipitated at the ordinary temperature appears to be zinc sulfid containing occluded hydrogen sulfid to an amount equivalent, approximately, to twenty-five per cent. of the precipitate. Further investigation is necessary to establish the nature of the physicochemical reactions which occur when $H_2S$ is conducted into a dilute aqueous solution of zinc sulfate at the ordinary temperature and when the mixture is subsequently heated; but I have fully proved by numerous trials that under the conditions just named the precipitation corresponds nearly enough to theory to make it practicably available, and at the same time it yields a solution nearly absolutely void of free $H_2S$ and at the right temperature for rapid oxidation and rapid solution of natural sulfids. Under the conditions mentioned, as already stated, no trace whatever of iron, manganese, nickel, or other metals is thrown down with the ZnS.

The presence of the already-precipitated zinc sulfid in the solution is absolutely essential before the temperature is raised. If the precipitate be separated and the solution alone heated, no further precipitation occurs.

My process founded upon the foregoing reactions and my researches thereupon are as follows: The ores or zinkiferous materials to be treated may consist of raw natural sulfids and of calcined or otherwise-oxidized zinkiferous material, or they may consist wholly of oxidized substances. They are to be lixiviated either in beds, troughs, vats, or in their natural position in veins or deposits by means of a lixiviating solution, which for oxidized material consists of ordinary or mine water containing not more than 1.5 per cent. of free sulfuric acid. For sulfid ores the solution must contain in addition to the free acid a very small amount of ferrous or ferric sulfate in solution, which exerts a catalytic action in the presence of the air at all ordinary temperatures, effecting the decomposition of the sulfids and the formation of sulfates, as it is alternately oxidized by the air with the absorption of a molecule of sulfuric acid and reduced by its action upon the sulfid, to the metallic component of which it yields the acid so absorbed. (See reactions 1 and 2.)

It is to be noted that there is no actual loss of sulfuric acid due to the reaction 4. A molecule of free acid is merely combined with two molecules of ferrous sulfate, to be afterward liberated in the free state upon precipitation of the zinc by $H_2S$. Actual loss or tying up of free acid can only occur when the material to be lixiviated contains carbonate or oxid of calcium or magnesium or carbonate of manganese or iron soluble in the lixiviating menstruum, but not decomposable by $H_2S$. In such case the loss may be repaired by subjecting the aerated liquor containing much iron to the action of the roaster-gases containing $SO_2$, when the following reaction occurs:

$$Fe_2(SO_4)_3 + SO_2 + 2H_2O = 2FeSO_4 + 2H_2SO_4,$$

resulting in an increment of one additional molecule of free sulfuric acid for two atoms of iron present as ferric sulfate, or the acidity may be restored by passing it over or through calcined or oxidized zinkiferous material which has itself been previously moistened and exposed to roaster-gases containing $SO_2$, followed by exposure to the air, whereby sulfite of zinc is rapidly converted to zinc sulfate, which being taken into solution yields free sulfuric acid upon precipitation with $H_2S$. After passing through the ore and becoming saturated to the limit of the free acid originally present with zinc, cadmium, and other metals contained in the ore the lixiviant is first conducted into a tank or set of tanks in which the metals whose sulfids are absolutely unaffected by dilute mineral acids (Cu, Cd, Hg, Ag, Bi) are to be separated either by the addition of a small and definite amount of $H_2S$ gas or by the addition of an exact equivalent or slight excess of precipitated zinc sulfid accompanied by agitation. I prefer the use of ZnS in slight excess for this purpose. The excess does no harm and is taken up in subsequent purifications. Without heating, the clear settled solution containing Zn, Fe, and possibly other metals whose sulfids are soluble in dilute or moderately dilute mineral acids (Mn, Ni, Co, U, &c.) is then drawn off into another vat or tank or series of tanks provided with tight-fitting covers, where it is subjected to the action of a measured quantity of $H_2S$ gas corresponding to the amount of zinc contained in the liquor, the gas being admitted under suitable pressure through a suitable conducting-tube. When the proper amount of gas has been admitted, the mixture is to be heated by the admission of steam through non-corrosive conducting-pipes until the precipitation of the ZnS is completed, which occurs usually between 160° and 180° Fahrenheit. The subsidence of the precipitate being very rapid, the lixiviant solution can be drawn of immediately after agitation has ceased, and it is at once ready to use again as a lixiviant by passing it through raw or calcined ores, &c., or in case ordinary mine-waters (many of which yield 0.3 per cent. or more of metallic zinc as they are pumped from the mine) are used as the source of zinkiferous liquors they are returned to the subterranean channels connected with the ore deposits through an opening located some distance from the pumping-shaft.

When the repeated use of acidulated water upon very impure ores or other zinkiferous material has caused it to be completely saturated with sulfates of iron, manganese, alumina, magnesia, &c., the sulfur content may be utilized in the greater part, if desired, by precipitation as calcium sulfate, along with the metallic hydroxids, using quicklime as a precipitant, calcining the precipitate with coal, and liberating the sulfur as $H_2S$ by treatment of the resultant CaS with limekiln-gas or carbon dioxid from any source. To replenish the lixiviant, however, it is not necessary to use fresh acid. A fresh supply of convenient strength can always be produced by the lixiviation of calcined or oxidized zinkiferous material with ordinary water charged with $SO_2$ from roaster-gases, which easily yields a solution containing 0.5 to 1.5 per cent. metallic zinc as sulfite and sulfate, which solution upon exposure to the air is rapidly converted wholly to sulfate and yields the required free acid upon precipitation with $H_2S$, as previously stated.

After the ore has been completely deprived of zinc, if it is composed of natural sulfids, the residue will consist of earthy matters mixed with all the sulfur in a free state that was previously combined with the zinc, copper, cadmium, &c., already dissolved out. It will contain also all the lead, silver, and gold, and practically all the pyrite and oxids of iron and manganese originally present. Being rich in free sulfur and freed from zinc blende, it can be calcined at a very low temperature, yielding a large amount of sulfur-dioxid fumes, a portion of which—namely, the amount derived from the liberated sulfur and corresponding theoretically to the quantity of $H_2S$ employed in precipitation, together with so much $SO_2$ derived from the combustion of pyrite (always associated with zinc sulfid in ores) as may be required to make up the losses—may be used for conversion into $H_2S$, either by reduction with glowing carbonaceous material in presence of steam or by absorption in lime and reduction with coal, followed by treatment of the calcium-sulfid product with limekiln gas or $CO_2$ from any source for the liberation of $H_2S$. The calcined residuum from silver and gold bearing zinkiferous sulfid ores is now in the best possible condition for the economical extraction of its lead, silver, and gold by smelting in a lead-smelting furnace and is to be so treated. If necessary, it may be again leached after calcination with the acidulated water for the purpose of extracting any zinc or copper that may have escaped extraction in the first lixiviation before being sent to the smeltery.

The precipitate obtained from the first treatment of the leach liquor after lixiviation and containing all the silver, copper, cadmium, &c., extracted from the ore, together with such excess of zinc sulfid as may have been added, is to be removed from the copper-cadmium precipitation-tank and subjected to the following special treatment, viz: First, if it contains a large excess of zinc sulfid the greater part of this may be removed by stirring it with ordinary lixiviating liquor which has been charged with copper sulfate by leaching cupriferous material, being careful not to add quite as much copper as is chemically equivalent to the zinc contents of the precipitate, for after all the zinc sulfid has been decomposed by copper sulfate cadmium sulfid is acted upon in the same manner. The clear liquor now containing zinc in solution is returned to the regular course of treatment for zinc and the silver-copper-cadmium residue (containing also bismuth, palladium, &c., if these were present in the ore) is heated to the boiling-point in a porcelain-lined vessel with dilute sulfuric acid containing fifteen per cent. $H_2SO_4$, whereby the cadmium is alone dissolved, along with any zinc sulfid remaining, leaving the silver and copper sulfids, &c., as an insoluble sediment. The clear solution is decanted or drawn off, the residue diluted with cold water, and filter-pressed, the filtrate being added to the stronger decanted fluid, and the mixture of fluids is after cooling subjected to the action of a stream of $H_2S$, by which means the whole of the cadmium is thrown down in the form of pure brilliant yellow or orange colored sulfid, salable after washing, filter-pressing, and drying, as "cadmium yellow." The acid solution resulting is to be added to the general stock of leach liquor. The copper-silver sulfid residue is to be calcined and smelted into metal, which is to be treated by ordinary electrolytic methods for the separation of the metals.

It is to be noted that the copper-sulfate solution used to extract the zinc from the cadmium-copper-sulfid precipitate must be free from ferric salt, which, if present, should be first reduced by treating the liquor with roaster-gases.

It has been already stated that the $H_2S$ required for the precipitation of the zinc, copper, cadmium, silver, &c., may be obtained indirectly from the sulfur contained in the original ores treated when these are sulfid ores, so that in such case the process is regenerative throughout as regards the zinc extraction, the only elements actually consumed being fuel, ore, and air. In the case of mine-waters being used as the source of zinc, &c., the residues of lixiviation being left under ground, the larger part of the sulfur required may be obtained by calcination of the zinc-sulfid precipitate, waste being made up by calcining pyrite, blende, &c. In case of blende or other ores of zinc associated with heavy spar, the residuum of the leaching operation being barium sulfate, this latter may be utilized as a very convenient means of supplying $H_2S$, yielding pure barium carbonate as a by-product. The sulfid of barium resulting from the calcination of barium sulfate with bituminous coal is very soluble in hot water and from the hot solution limekiln-gas liberates $H_2S$ gas and precipitates $BaCO_3$.

In the case of purely-oxidized ores being subjected to lixiviation and treatment of the solution with $H_2S$ according to my method either calcium sulfid or barium sulfid derived from the reduction of gypsum or heavy spar by coal may be used as the source of $H_2S$, and, if desirable, the sulfates may be regenerated by means of sulfur dioxid derived from calcining the precipitated metallic sulfids.

It is not necessary that the $H_2S$ gas used in the process shall be either pure or concentrated. Good results have been obtained by me in the precipitation of zinc sulfid from mine-waters in tanks holding one hundred cubic feet of water by using gas containing under one per cent. of actual $H_2S$ as a precipitant. Gases containing twenty to thirty per cent. of $H_2S$ may be easily obtained from the action of limekiln-gases upon calcium sulfid or barium sulfid, and quite pure $H_2S$ is obtainable from barium sulfid by its decomposition with pure carbon dioxid derived from the action of a stock solution of sodium sulfite saturated by ordinary roaster-fumes containing $SO_2$ upon the precipitated barium carbonate obtained in a prior operation. In this case the sodium sulfite is regenerated, insoluble barium sulfite precipitated, (which is again reduced to sulfid by ignition with coal,) and pure $CO_2$ liberated, which in turn liberates pure $H_2S$ from a heated solution of barium sulfid.

In case it is desired to carry on the manufacture of zinc chlorid in connection with the process described pure $H_2S$ may be obtained from the decomposition of zinc sulfid with hydrochloric acid. In this case the decomposition is carried on in stills, about forty per cent. of the acid used being volatilized and again condensed, while the $H_2S$ is liberated as a pure gas, as described in my application for patent of this date for a process of manufacture of zinc chlorid.

To carry out my process, as described, there are required leaching-vats, launders or beds, storage tanks or reservoirs for the liquors, precipitating-tanks provided with the necessary fixtures of inlet and outlet pipes, force-pumps, launders, a waste-gas tower for utilizing nearly-spent gases, a gas-holder with force-pump and all necessary pipe connections and meters, refining vessels for the treatment of cadmiferous precipitates, calcining-furnaces with dust-settling flues and exhaust-fan, and the necessary appliances for the regeneration of hydrogen sulfid, which may preferably consist of calcining-furnaces for reduction of alkali-earth sulfates to sulfids, grinding apparatus, leach-vats, (in case of BaS,) and closed steam-heated gas-generating tanks connected with the gas-holder on one hand and the source of carbon-dioxid supply upon the other. This may consist simply of an ordinary flame-fired limekiln provided with gas conducting and cooling tubes and a gas-forcing pump.

In the drawings I have shown in diagrammatic form the principal apparatus required in carrying out my invention.

I have stated that $H_2S$ may be produced by the reduction of the $SO_2$ contained in the roaster-fumes accompanied by steam by means of carbonaceous fuel by the ordinary water-gas process. I have also obtained $H_2S$ by the direct action of superheated steam upon zinc sulfid and upon blende; but further experiment is necessary to prove whether either of these methods can be used economically.

It will be understood that my invention includes the equivalent of the agents referred to herein and that when free sulfuric acid is mentioned its equivalent is free hydrochloric acid in a less percentage, as stated. The leaching or lixiviating agent used, according to the requirements, is the dilute acidulated water containing not more than 1.5 per cent. of free sulfuric acid or free sulfuric acid with ferric sulfate, or I may use water containing not more than 1.1 per cent. of free hydrochloric acid or ferric chlorid and free hydrochloric acid as the leaching agent. I also wish it understood that the hydrogen sulfid and the zinc sulfid are equivalents in the preliminary precipitation, or I may use zinc sulfid and hydrogen sulfid together for this purpose.

What I claim is—

1. The hereinbefore-described process, consisting in leaching zinkiferous ores residues, metallurgical products, or natural deposits, with a weakly-acidulated water, containing not to exceed 1.5 per cent. of free sulfuric acid, or its equivalent of other mineral acid, precipitating the metals of the copper group by agitation with a soluble sulfid, and finally separating the zinc by means of hydrogen sulfid, substantially as described.

2. The process herein described, consisting in leaching crude zinkiferous ores, residues, or products, by a leaching agent consisting of dilute acidulated water containing not more than 1.5 per cent. free sulfuric acid together with an indefinite amount of dissolved ferric sulfate; precipitating the metals of the copper group by agitation with a slight excess of a soluble sulfid, and finally separating the zinc by means of hydrogen sulfid, substantially as described.

3. The process herein described, consisting in treating zinkiferous mine-waters containing metals of the copper-silver-cadmium group in solution by the use of precipitated zinc sulfid or its equivalent, in amount chemically equivalent to or slightly in excess of the metals of the copper group present in the waters and finally separating the zinc by means of hydrogen sulfid, substantially as described.

4. The method of separating zinc as pure zinc sulfid, from dilute solutions consisting of either natural mine-waters, or the products of artificial lixiviation of zinkiferous materials, containing not more than one per cent. of zinc and other metals whose sulfids are insoluble in extremely-dilute mineral acids, in solution, either as sulfates or chlorids, and containing also the soluble salts of any or all other metals, which method consists in precipitating the metals of the copper-silver-cadmium group as sulfids, by adding thereto their equivalent or a very slight excess, of a soluble sulfid, drawing off the clear solution after the subsidence of the sulfid named, and subjecting it to the action of an additional amount of hydrogen sulfid, equal to, or in slight excess over, the equivalent of the zinc present in solution, for the purpose of partially separating the zinc as sulfid, and finally subjecting the solution to a temperature of 150° to 180° Fahrenheit for the purpose of completing the separation of the zinc sulfid in a pure state and regenerating the acid of the solution, so that it may be used for leaching with the same effect as before, substantially as hereinbefore described.

5. The method of extracting zinc, cadmium and other metals from ores, metallurgical products, residues, or precipitates, containing zinc, or zinc and any other metal, or metals, which consists in leaching such ores, products, residues, or precipitates, with a very dilute acidulated, aqueous solution containing not more than 1.5 per cent. of free sulfuric acid or its equivalent; subjecting the leach liquor, or filtrate, to treatment with precipitated zinc sulfid as described in amount equal to, or slightly in excess of, the equivalent of the metals of the copper-cadmium-silver group present in the solution, for the purpose of separating them as sulfids; decanting or drawing off the clear liquor from such precipitated sulfids and subjecting it to action of a quantity of hydrogen-sulfid gas in amount equal to, or slightly in excess of, the equivalent of the zinc contained in the solution; subsequently heating the solution to effect complete separation of the zinc sulfid; decanting or drawing off the clear liquid to be used over again, washing, filter-pressing and drying the precipitated sulfid, as before described.

6. The process of extracting zinc, copper, cadmium and other metals from subterranean deposits without raising their respective ores to the surface, which consists in supplying to the higher parts of such deposits, through a suitable opening, water containing free sulfuric acid to an amount not exceeding 1.5 per cent. or its equivalent together with any amount of a salt of iron in solution; pumping the mine-water from the lower parts of such deposits or veins; subjecting the water thus obtained to the action of a definite amount of precipitated zinc sulfid, or of hydrogen sulfid corresponding to, or slightly in excess of, the equivalent of the metals of the copper-silver-cadmium group present in the solution; drawing off the clear solution and precipitating the zinc therefrom as zinc sulfid by means of an equivalent amount of hydrogen sulfid introduced into the solution; heating the solution; drawing off the clear acid fluid and returning the same to the subterranean mineral deposits and finally washing, filter-pressing and drying the precipitated zinc sulfid so obtained, substantially as described.

In testimony whereof I affix my signature in presence of two witnesses.

WILLIAM GEORGE WARING.

Witnesses:
A. M. HULL,
GUY H. WARING.